US012694673B2

(12) United States Patent
Liu et al.

(10) Patent No.: US 12,694,673 B2
(45) Date of Patent: Jul. 28, 2026

(54) CROSS-MODAL PROCESSING FOR VISION AND LANGUAGE

(71) Applicant: Microsoft Technology Licensing, LLC, Redmond, WA (US)

(72) Inventors: Bei Liu, Redmond, WA (US); Jianlong Fu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 18/278,356

(22) PCT Filed: Feb. 24, 2022

(86) PCT No.: PCT/US2022/017595
§ 371 (c)(1),
(2) Date: Aug. 22, 2023

(87) PCT Pub. No.: WO2022/187063
PCT Pub. Date: Sep. 9, 2022

(65) Prior Publication Data
US 2024/0185602 A1      Jun. 6, 2024

(30) Foreign Application Priority Data

Mar. 5, 2021    (CN) .......................... 202110247301.4

(51) Int. Cl.
*G06F 40/40* (2020.01)
*G06V 20/40* (2022.01)
(52) U.S. Cl.
CPC .............. *G06V 20/41* (2022.01); *G06F 40/40* (2020.01)
(58) Field of Classification Search
CPC ........ G06V 20/41; G06V 20/49; G06V 20/40; G06F 40/20; G06F 40/40; G06F 40/30; G06N 3/045; G06N 3/08; G06N 3/084
See application file for complete search history.

(56) References Cited

U.S. PATENT DOCUMENTS 9,965,705 B2    5/2018 Chen et al.
2020/0097604 A1    3/2020 Lee et al.
(Continued)

FOREIGN PATENT DOCUMENTS

CN    105760507 A    7/2016
CN    109902166 A    6/2019
(Continued)

OTHER PUBLICATIONS

First Office Action Received for Chinese Application No. 202110247301.4, mailed on May 27, 2024, 14 pages (English Translation Provided).
(Continued)

*Primary Examiner* — Huyen X Vo
(74) *Attorney, Agent, or Firm* — Schwegman Lundberg & Woessner, P.A.

(57) ABSTRACT

According to implementations of the present disclosure, a solution for cross-modal processing is provided. In this solution, a set of visual features of a training image is extracted according to a visual feature extraction sub-model in a target model. Each visual feature is corresponding to a pixel block in the training image. A set of visual semantic features corresponding to the set of visual features is determined based on a visual semantic dictionary. A set of text features of a training text corresponding to the training image is extracted according to a text feature extraction sub-model in the target model. Each text feature is corresponding to at least one word in the training text. The target model is trained based on the set of visual semantic features and the set of text features to determine association information between an input text and an input image.

14 Claims, 8 Drawing Sheets

(56) References Cited

U.S. PATENT DOCUMENTS

| | | | | |
|---|---|---|---|---|
| 2020/0356829 | A1 | 11/2020 | Costabello | |
| 2021/0271707 | A1* | 9/2021 | Lin | G06V 30/274 |
| 2021/0303921 | A1* | 9/2021 | Niu | G06F 40/30 |
| 2023/0005178 | A1* | 1/2023 | Liu | G06V 30/274 |

FOREIGN PATENT DOCUMENTS

| | | |
|---|---|---|
| CN | 111461203 A | 7/2020 |
| WO | 2020190112 A1 | 9/2020 |

OTHER PUBLICATIONS

Ramesh, Aditya, "Zero-Shot Text-to-Image Generation", OpenAI, Feb. 26, 2021, 20 pages.

Alberti, et al., "Fusion of Detected Objects in Text for Visual Question Answering", In Proceedings of the Conference on Empirical Methods in Natural Language Processing and the 9th International Joint Conference on Natural Language Processing, Nov. 3, 2019, pp. 2131-2140.

Anderson, et al., "Bottom-Up and Top-Down Attention for Image Captioning and Visual Question Answering", In Proceedings of IEEE/CVF Conference on Computer Vision and Pattern Recognition, Jun. 18, 2018, pp. 6077-6086.

Antol, et al., "VQA: Visual Question Answering", In Proceedings of the IEEE International Conference on Computer Vision, Dec. 7, 2015, pp. 2425-2433.

Bowman, et al., "A Large Annotated Corpus for Learning Natural Language Inference", In Proceedings of the Conference on Empirical Methods in Natural Language Processing, Sep. 17, 2015, pp. 632-642.

Cadene, et al., "Mutan: Multimodal Tucker Fusion for Visual Question Answering", In Proceedings of the IEEE International Conference on Computer Vision, Oct. 22, 2017, pp. 2612-2620.

Carion, et al., "End-to-End Object Detection with Transformers", In Repository of arXiv:2005.12872v3, May 28, 2020, 26 Pages.

Chen, et al., "UNITER: UNiversal Image-TExt Representation Learning", In Proceedings of the 16th European Conference on Computer Vision, Aug. 23, 2020, 17 Pages.

Conneau, et al., "Cross-lingual Language Model Pretraining", In Proceedings of the 33rd International Conference on Neural Information Processing Systems, Dec. 8, 2019, 11 Pages.

Deng, et al., "ImageNet: A Large-scale Hierarchical Image Database", In IEEE Conference on Computer Vision and Pattern Recognition, Jun. 20, 2009, pp. 248-255.

Devlin, et al., "BERT: Pre-training of Deep Bidirectional Transformers for Language Understanding", In Proceedings of the NAACL-HLT, Jun. 2, 2019, pp. 4171-4186.

Faghri, et al., "VSE++: Improving Visual-Semantic Embeddings with Hard Negatives", In Proceedings of the 29th British Machine Vision Conference, Sep. 3, 2018, 13 Pages.

Fu, et al., "Look Closer to See Better: Recurrent Attention Convolutional Neural Network for Fine-Grained Image Recognition", In Proceedings of IEEE Conference on Computer Vision and Pattern, Jul. 21, 2017, pp. 4476-4484.

Goyal, et al., "Making the V in VQA Matter: Elevating the Role of Image Understanding in Visual Question Answering", In Proceedings of IEEE Conference on Computer Vision and Pattern Recognition, Jul. 21, 2017, pp. 6325-6334.

Guo, et al., "LAMP: Label Augmented Multimodal Pretraining", In Repository of arXiv:2012.04446v1, Dec. 8, 2020, 9 Pages.

He, et al., "Deep Residual Learning for Image Recognition", In Proceedings of IEEE Conference on Computer Vision and Pattern Recognition, Jun. 27, 2016, pp. 770-778.

Huang, et al., "Pixel-BERT: Aligning Image Pixels with Text by Deep Multi-modal Transformers", In Repository of arXiv:2004.00849v2, Jun. 22, 2020, 17 Pages.

Jiang, et al., "In Defense of Grid Features for Visual Question Answering", In Proceedings of the IEEE/CVF Conference on Computer Vision and Pattern Recognition, Jun. 13, 2020, pp. 10267-10276.

Karpathy, et al., "Deep Visual-Semantic Alignments for Generating Image Descriptions", In Proceedings of the IEEE Conference on Computer Vision and Pattern Recognition, Jun. 7, 2015, pp. 3128-3137.

Kim, et al., "Bilinear Attention Networks", In Proceedings of 32nd Conference on Neural Information Processing Systems, May 21, 2018, 11 Pages.

Krishna, et al., "Visual Genome: Connecting Language and Vision using Crowdsourced Dense Image Annotations", In International Journal of Computer Vision, vol. 123, May 15, 2017, pp. 32-73.

Lee, et al., "Stacked Cross Attention for Image-Text Matching", In Proceedings of the European Conference on Computer Vision, Sep. 8, 2018, 16 Pages.

Li, et al., "Oscar: Object-semantics Aligned Pre-training for Vision-language Tasks", In Proceedings of the European Conference on Computer Vision, Aug. 23, 2020, 21 Pages.

Zhou, et al., "Unified Vision-Language Pre-Training for Image Captioning and VQA", In Proceedings of the Thirty-Fourth AAAI Conference on Artificial Intelligence, Feb. 7, 2020, pp. 13041-13049.

Li, et al., "Semvlp: Vision-Language Pre-Training by Aligning Semantics at Multiple Levels", In Proceedings of the International Conference on Learning Representations, Retrieved Date: Jan. 5, 2021, 11 Pages.

Li, et al., "Unicoder-VL: A Universal Encoder for Vision and Language by Cross-Modal Pre-Training", In Proceedings of the Thirty-Fourth AAAI Conference on Artificial Intelligence, Feb. 7, 2020, pp. 11336-11344.

Li, et al., "Visualbert: A Simple and Performant Baseline for Vision and Language", In Repository of arXiv:1908.03557v1, Aug. 9, 2019, 14 Pages.

Lin, et al., "Microsoft COCO: Common Objects in Context", In Proceeding of the European Conference on Computer Vision, May 1, 2014, pp. 740-755.

Lu, et al., "VILBERT: Pretraining Task-Agnostic Visiolinguistic Representations for Vision-and-Language Tasks", In Proceeding of the 33rd Conference on Neural Information Processing Systems, Dec. 8, 2019, 11 Pages.

Messina, et al., "Transformer Reasoning Network for Image-Text Matching and Retrieval", In Repository of arXiv:2004.09144v2, Jun. 22, 2020, 8 Pages.

Oord, et al., "Neural Discrete Representation Learning", In Proceeding of the 31st Conference on Neural Information Processing Systems, Dec. 4, 2017, 10 Pages.

"International Search Report and Written Opinion Issued in PCT Application No. PCT/US22/017595", Mailed Date: Jul. 8, 2022, 12 Pages.

Plummer, et al., "Flickr30k Entities: Collecting Region-to-Phrase Correspondences for Richer Image-to-Sentence Models", In Proceedings of IEEE International Conference on Computer Vision, Dec. 7, 2015, pp. 2641-2649.

Qi, et al., "ImageBERT: Cross-Modal Pre-Training with Large-Scale Weak-Supervised Image-Text Data", In Repository of arXiv:2001.07966v2, Jan. 23, 2020, 12 Pages.

Ramesh, et al., "Zero-Shot Text-to-Image Generation", In Repository of arXiv:2102.12092v2, Feb. 25, 2021, 20 Pages.

Ren, et al., "Faster R-CNN: Towards Real-Time Object Detection with Region Proposal Networks", In Proceedings of the 28th International Conference on Neural Information Processing Systems, Dec. 7, 2015, 9 Pages.

Singh, et al., "Pythia—A platform for Vision & Language Research", In Proceedings of SysML Workshop, NeurIPS, 2018, 4 Pages.

Su, et al., "VL-BERT: Pre-training of Generic Visual-Linguistic Representations", In Proceedings of Eighth International Conference on Learning Representations, Apr. 26, 2020, 16 Pages.

Suhr, et al., "A Corpus for Reasoning About Natural Language Grounded in Photographs", In Proceedings of the 57th Annual Meeting of the Association for Computational Linguistics, Jul. 2019, 11 Pages.

(56) References Cited

OTHER PUBLICATIONS

Sun, et al., "VideoBERT: A Joint Model for Video and Language Representation Learning", In Proceedings of IEEE/CVF International Conference on Computer Vision, Oct. 27, 2019, pp. 7463-7473.

Tan, et al., "LXMERT: Learning Cross-Modality Encoder Representations from Transformers", In Proceedings of the Conference on Empirical Methods in Natural Language Processing, Nov. 3, 2019, pp. 5100-5111.

Vaswani, et al., "Attention Is All You Need", In Proceedings of 31st Conference on Neural Information Processing Systems, Dec. 4, 2017, 11 Pages.

Vella, et al., "Information Fusion Techniques for Automatic Image Annotation", In Proceedings of the Second International Conference on Computer Vision Theory and Applications, 2007, pp. 60-67.

Wang, et al., "MiniVLM: A Smaller and Faster Vision-Language Model", In Repository of arXiv:2012.06946v1, Dec. 13, 2020, 11 Pages.

Wu, et al., "Google's Neural Machine Translation System: Bridging the Gap between Human and Machine Translation", In Repository of arXiv:1609.08144v2, Oct. 8, 2016, 23 Pages.

Xie, et al., "Aggregated Residual Transformations for Deep Neural Networks", In Proceedings of the IEEE Conference on Computer Vision and Pattern Recognition, Jul. 21, 2017, pp. 1492-1500.

Xie, et al., "Visual Entailment Task for Visually-Grounded Language Learning", In Proceedings of the 32nd Conference on Neural Information Processing Systems, Nov. 26, 2018, 7 Pages.

Zhang, et al., "Why Adam Beats SGD for Attention Models", In Repository of arXiv:1912.03194v1, Dec. 6, 2019, 20 Pages.

Zhicheng, et al., "Seeing out of the Box: End-to-end Pre-training for Vision-language Representation Learning", In Proceedings of the IEEE/CVF Conference on Computer Vision and Pattern Recognition, Jun. 19, 2021, pp. 12971-12980.

Second Office Action Received for Chinese Application No. 202110247301.4, mailed on Oct. 31, 2024, 14 pages (English Translation Provided).

Third Office Action Received for Chinese Application No. 202110247301.4, mailed on Mar. 31, 2025, 15 pages (English Translation Provided).

Notice to Grant Received for Chinese Application No. 202110247301.4, mailed on Jul. 1, 2025, 04 pages (English Translation Provided).

* cited by examiner

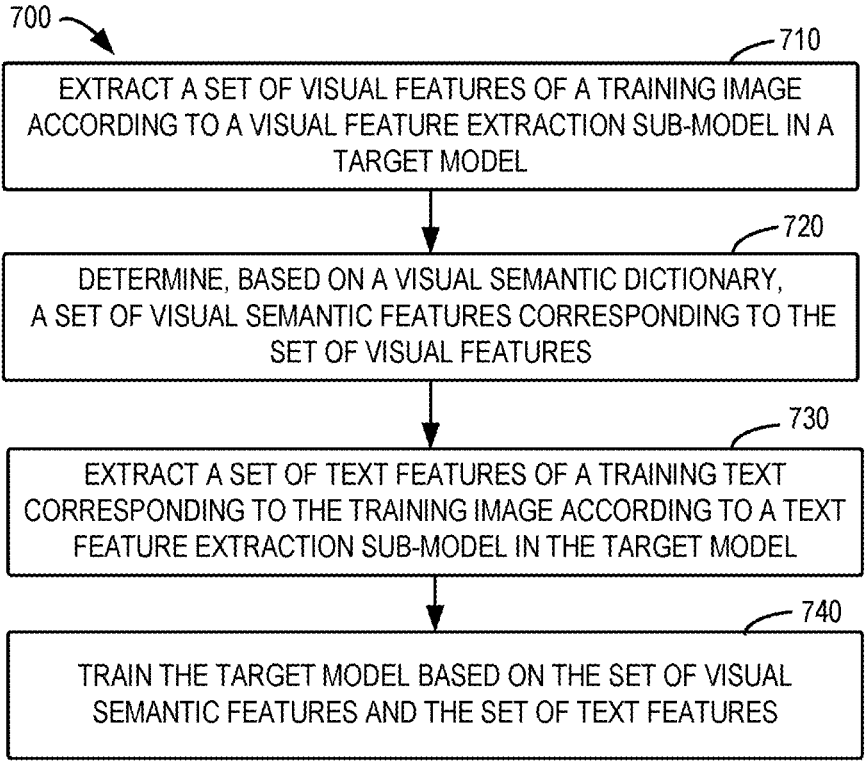

700

710

EXTRACT A SET OF VISUAL FEATURES OF A TRAINING IMAGE ACCORDING TO A VISUAL FEATURE EXTRACTION SUB-MODEL IN A TARGET MODEL

720

DETERMINE, BASED ON A VISUAL SEMANTIC DICTIONARY, A SET OF VISUAL SEMANTIC FEATURES CORRESPONDING TO THE SET OF VISUAL FEATURES

730

EXTRACT A SET OF TEXT FEATURES OF A TRAINING TEXT CORRESPONDING TO THE TRAINING IMAGE ACCORDING TO A TEXT FEATURE EXTRACTION SUB-MODEL IN THE TARGET MODEL

740

TRAIN THE TARGET MODEL BASED ON THE SET OF VISUAL SEMANTIC FEATURES AND THE SET OF TEXT FEATURES

FIG. 7

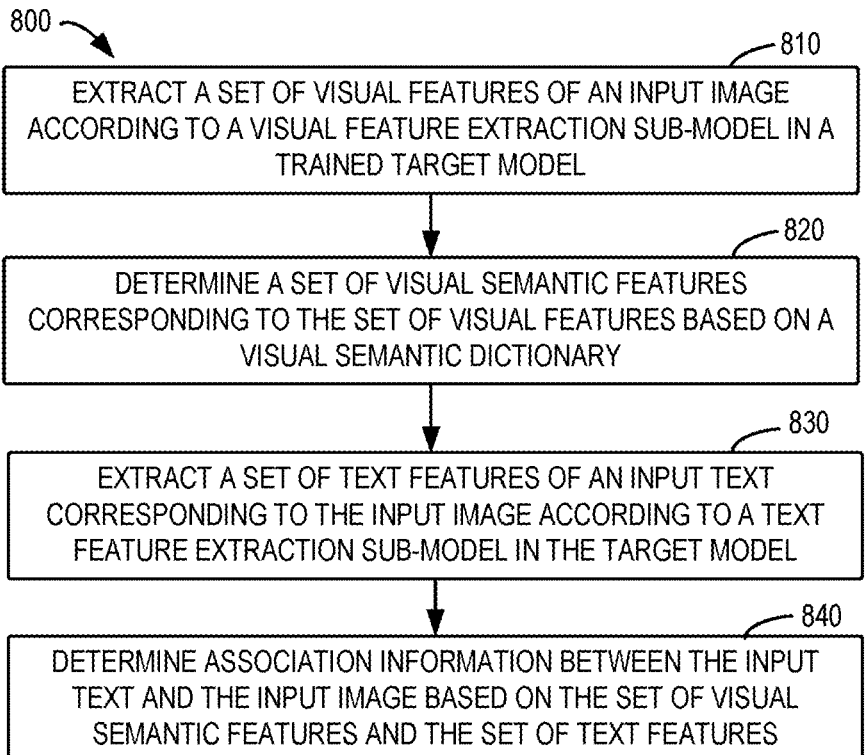

800

810

EXTRACT A SET OF VISUAL FEATURES OF AN INPUT IMAGE ACCORDING TO A VISUAL FEATURE EXTRACTION SUB-MODEL IN A TRAINED TARGET MODEL

820

DETERMINE A SET OF VISUAL SEMANTIC FEATURES CORRESPONDING TO THE SET OF VISUAL FEATURES BASED ON A VISUAL SEMANTIC DICTIONARY

830

EXTRACT A SET OF TEXT FEATURES OF AN INPUT TEXT CORRESPONDING TO THE INPUT IMAGE ACCORDING TO A TEXT FEATURE EXTRACTION SUB-MODEL IN THE TARGET MODEL

840

DETERMINE ASSOCIATION INFORMATION BETWEEN THE INPUT TEXT AND THE INPUT IMAGE BASED ON THE SET OF VISUAL SEMANTIC FEATURES AND THE SET OF TEXT FEATURES

FIG. 8

CROSS-MODAL PROCESSING FOR VISION AND LANGUAGE

CROSS-REFERENCE TO RELATED APPLICATION

This application is a U.S. National Stage Filing under 35 U.S.C. 371 of International Patent Application Serial No. PCT/US2022/017595, filed Feb. 24, 2022, and published as WO 2022/187063 A1 on Sep.9, 2022, which claims priority to Chinese Application No. 202110247301.4, filed Mar. 5, 2021, which applications and publication are incorporated herein by reference in their entirety.

BACKGROUND

In the field of artificial intelligence, image processing and natural language processing have been significantly developed and widely applied. Consequently, cross-modal processing needs for vision and language have arisen for various vision-language tasks. Such vision-language tasks include, for example, image-text retrieval, visual question answering (VQA), natural language for visual reasoning (NLVR), etc. So far some cross-modal processing techniques have been proposed for these vision-language tasks.

SUMMARY

According to implementations of the present disclosure, there is provided a solution for cross-modal processing. In this solution, a set of visual features of a training image is extracted according to a visual feature extraction sub-model in a target model. Each visual feature is corresponding to a pixel block in the training image. A set of visual semantic features corresponding to the set of visual features is determined based on a visual semantic dictionary. A set of text features of a training text corresponding to the training image is extracted according to a text feature extraction sub-model in the target model. Each text feature is corresponding to at least one word in the training text. The target model is trained based on the set of visual semantic features and the set of text features to determine association information between an input text and an input image. In this way, the trained target model can be facilitated to accurately and fast provide results in various vision-language tasks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 7 illustrates a flowchart of a method of training a model according to some implementations of the present disclosure; and FIG. 8 illustrates a flowchart of a method of applying a model according to some implementations of the present disclosure.

Throughout the drawings, the same or similar reference signs refer to the same or similar elements.

DETAILED DESCRIPTION

Figure 1:
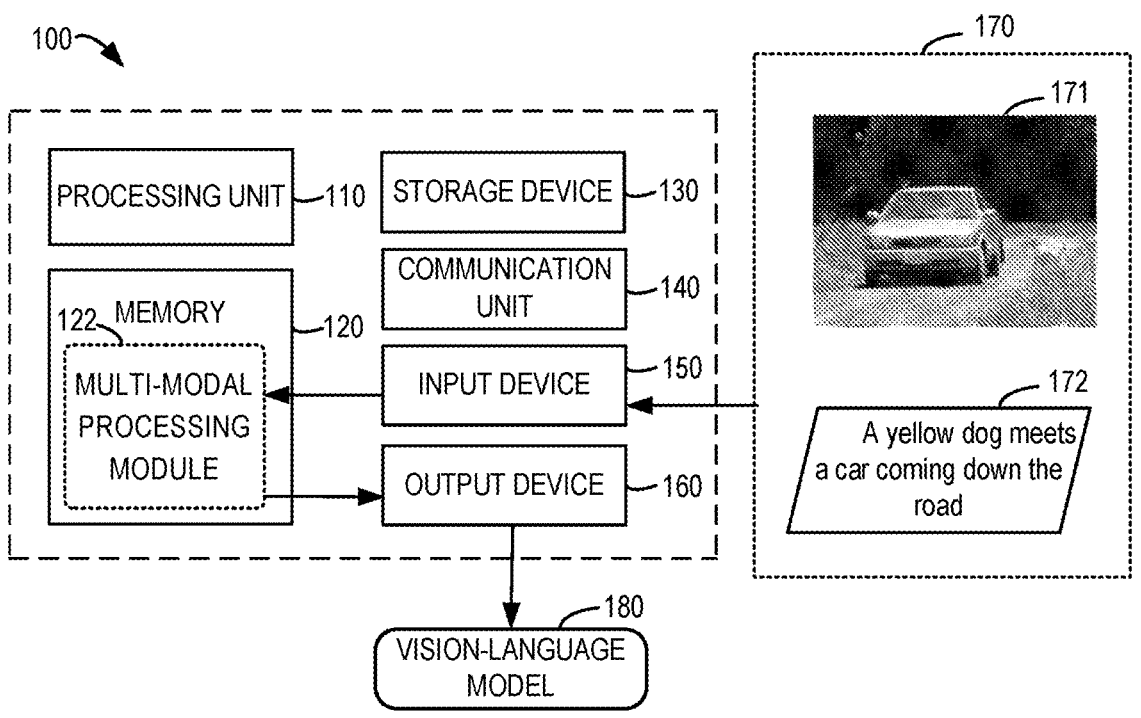
FIG. 1 illustrates a block diagram of a computing device which can implement implementations of the present disclosure.

The present disclosure will now be discussed with reference to several example implementations. It is to be understood these implementations are discussed only for the purpose of enabling persons skilled in the art to better understand and thus implement the present disclosure, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As used herein, the term "neural network" can handle inputs and provide corresponding outputs and it generally includes an input layer, an output layer and one or more hidden layers between the input and output layers. The neural network used in the deep learning applications generally includes a plurality of hidden layers to extend the depth of the network. Individual layers of the neural network model are connected in sequence, such that an output of a preceding layer is provided as an input for a following layer, where the input layer receives the input of the neural network while the output of the output layer acts as the final output of the neural network. Each layer of the neural network includes one or more nodes (also referred to as processing nodes or neurons), each of which processes the input from the preceding layer. In the text, the terms "neural network," "network" and "neural network model" may be used interchangeably.

As mentioned above, some cross-modal learning approaches have been proposed or various vision-language tasks. An important target of vision-language learning is to bridge the semantic gap between visual and language domains and to align vision and language in a common space. An attention mechanism has been proposed for building the connection between the visual and language domains, including both pre-training for models and downstream task-specific training. For visual input, these existing approaches extract region-level visual features by using object detection models. However, regions are not always well detected by the object detection models and the detected regions are be limited by pre-defined categories used by the object detection models.

There are some problems with using region-level visual features for vision-language understanding. Firstly, detected regions focus on objects inside bounding boxes while neglecting contextual information outside the bounding boxes. Global context of images is very important for relation understanding and reasoning in the language domain. However, a region-level visual feature only represents a portion of an image and lacks the global context of the image, which makes it difficult for existing approaches to fully understand the semantics of the image. For example, without the contextual information, existing approaches will misunderstand the relation between the detected objects and provide an incorrect answer for text retrieval or VQA. Secondly, in existing approaches, visual understanding of images is limited by the pre-defined object categories (e.g., 1600 objects) and attribute categories (e.g., 400 attributes). Other semantics than the predefined object and attribute categories are neglected.

In addition, region-level visual features are extracted by the object detection models, which suffers from low quality, noise, over-sampling and other factors. The use of the object detection models also makes end-to-end training difficult. The extracted region-level visual features have a semantic gap with the language domain, while it is challenging for existing approaches to bridge the gap by only one or several fully connected layers.

According to implementations of the present disclosure, a solution for cross-modal processing is provided so as to solve one or more of the above problem and other potential problems. In the solution, a set of visual features of a training image is extracted according to a visual feature extraction sub-model in a vision-language model. Each visual feature is corresponding to a pixel block in the training image. A set of visual semantic features corresponding to the set of visual features is determined based on a visual semantic dictionary. A set of text features of a training text corresponding to the training image is extracted according to a text feature extraction sub-model in the vision-language model. Each text feature is corresponding to at least one word in the training text. The vision-language model is trained based on the set of visual semantic features and the set of text features.

In this way, the trained vision-language model can extract comprehensive image features for cross-modal understanding. The trained vision-language model can provide more accurate results in processing various vision-language tasks. In addition, without the need of object detection, the trained vision-language model can accelerate the inference time in processing vision-language tasks as compared to the existing approaches, for example, the inference time can be accelerated by 10 times. Therefore, the vision-language model can better support online vision-language applications.

Various example implementations of the solution are described in detail below in conjunction with the drawings.

Example Environment

FIG. 1 illustrates a block diagram of a computing device 100 which can implement implementations of the present disclosure. It should be understood that the computing device 100 shown in FIG. 1 is only exemplary and shall not constitute any limitation on the functions and scopes of the implementations described by the present disclosure. As shown in FIG. 1, the computing device 100 includes a computing device 100 in the form of a general purpose computing device. Components of the computing device 100 may include, but is not limited to, one or more processors or processing units 110, a memory 120, a storage device 130, one or more communication units 140, one or more input devices 150, and one or more output devices 160.

In some implementations, the computing device 100 may be implemented as various user terminals or service terminals with computing capability. The service terminals may be servers, large-scale computing devices, and the like provided by a variety of service providers. The user terminal, for example, is a mobile terminal, a fixed terminal or a portable terminal of any type, including a mobile phone, a site, a unit, a device, a multimedia computer, a multimedia tablet, Internet nodes, a communicator, a desktop computer, a laptop computer, a notebook computer, a netbook computer, a tablet computer, a Personal Communication System (PCS) device, a personal navigation device, a Personal Digital Assistant (PDA), an audio/video player, a digital camera/video, a positioning device, a television receiver, a radio broadcast receiver, an electronic book device, a gaming device or any other combination thereof, including accessories and peripherals of these devices or any other combination thereof. It may also be predicted that the computing device 100 can support any type of user-specific interface (such as a "wearable" circuit, and the like).

The processing unit 110 may be a physical or virtual processor and may execute various processing based on the programs stored in the memory 120. In a multi-processor system, a plurality of processing units executes computer-executable instructions in parallel to enhance parallel processing capability of the computing device 100. The processing unit 110 can also be known as a central processing unit (CPU), microprocessor, controller and microcontroller.

The computing device 100 usually includes a plurality of computer storage mediums. Such mediums may be any attainable medium accessible by the computing device 100, including but not limited to, a volatile and non-volatile medium, a removable and non-removable medium. The memory 120 may be a volatile memory (e.g., a register, a cache, a Random Access Memory (RAM)), a non-volatile memory (such as, a Read-Only Memory (ROM), an Electrically Erasable Programmable Read-Only Memory (EEPROM), flash), or any combination thereof. The memory 120 may include a multi-modal processing module 122, which are configured to perform various functions described herein. The multi-modal processing module 122 may be accessed and operated by the processing unit 110 to realize corresponding functions.

The storage device 130 may be a removable or non-removable medium, and may include a machine-readable medium (e.g., a memory, a flash drive, a magnetic disk) or any other medium, which may be used for storing information and/or data and be accessed within the computing device 100. The computing device 100 may further include additional removable/non-removable, volatile/non-volatile storage mediums. Although not shown in FIG. 1, there may be provided a disk drive for reading from or writing into a removable and non-volatile disk and an optical disc drive for reading from or writing into a removable and non-volatile optical disc. In such cases, each drive may be connected to a bus (not shown) via one or more data medium interfaces.

The communication unit 140 implements communication with another computing device via a communication medium. Additionally, functions of components of the computing device 100 may be implemented by a single computing cluster or a plurality of computing machines, and these computing machines may communicate through communication connections. Therefore, the computing device 100 may operate in a networked environment using a logic connection to one or more other servers, a Personal Computer (PC) or a further general network node.

The input device 150 may be one or more various input devices, such as a mouse, a keyboard, a trackball, a voice-input device, and the like. The output device 160 may be one or more output devices, e.g., a display, a loudspeaker, a printer, and so on. The computing device 100 may also communicate through the communication unit 140 with one or more external devices (not shown) as required, where the external device, e.g., a storage device, a display device, and so on, communicates with one or more devices that enable users to interact with the computing device 100, or with any device (such as a network card, a modem, and the like) that enable the computing device 100 to communicate with one or more other computing devices. Such communication may be executed via an Input/Output (I/O) interface (not shown).

In some implementations, apart from being integrated on an individual device, some or all of the respective components of the computing device 100 may also be set in the form of a cloud computing architecture. In the cloud computing architecture, these components may be remotely arranged and may cooperate to implement the functions described by the present disclosure. In some implementations, the cloud computing provides computation, software, data access and storage services without informing a terminal user of physical locations or configurations of systems or hardware providing such services. In various implementations, the cloud computing provides services via a Wide Area Network (such as Internet) using a suitable protocol. For example, the cloud computing provider provides, via the Wide Area Network, the applications, which can be accessed through a web browser or any other computing component. Software or components of the cloud computing architecture and corresponding data may be stored on a server at a remote location. The computing resources in the cloud computing environment may be consolidated at a remote datacenter or dispersed. The cloud computing infrastructure may provide, via a shared datacenter, the services even though they are shown as a single access point for the user. Therefore, components and functions described herein can be provided using the cloud computing architecture from a service provider at a remote location. Alternatively, components and functions may also be provided from a conventional server, or they may be mounted on a client device directly or in other ways.

The computing device 100 may be used for implementing multi-modal processing in various implementations of the present disclosure. As shown in FIG. 1, the computing device 100 may receive a training dataset 170 through the input device 150. The training dataset 170 comprises a plurality of image-text pairs, each image-text pair comprising a training image and a training text corresponding to the training image. FIG. 1 shows an example of an image-text pair, i.e., a training image 171 and a training text 172 corresponding to the training image 171.

In some implementations, the training image and training text in each image-text pair may be matched or aligned. For example, the training text 172 describes the training image 171. In some implementations, the training image and training text in some image-text pairs may not be matched, while the training image and training text in other image-text pairs may be matched. In such implementations, the training dataset 170 further comprises a label which indicates whether the training image and training text are matched.

Although the training text 172 is shown in English in the example described herein, it should be understood that this is merely illustrative and not intended to limit the protection scope of the present disclosure. Implementations of the present disclosure are applicable to text in any language.

The computing device 100 trains a vision-language model 180 by using the training dataset 170. Accordingly, the vision-language model 180 may also be referred to as a "target model." The trained vision-language model 180 may be used in a vision-language task to determine association information between an image and a text. In some implementations, the training of the vision-language model 180 at the computing device 100 may be pre-training for universal tasks. The resulting vision-language model 180 may subsequently be fine-tuned for a specific task to which the vision-language model 180 is to be applied.

The specific task to which the vision-language model 180 is applied is also referred to as a "downstream task." Downstream tasks may include, but not limited to, image retrieval, text retrieval, VQA, NLVR, visual entailment (VE), text generation based on an image, image generation based on a text, etc.

In some implementations, the training of the vision-language model 180 at the computing device 100 may be fine-tuning of the trained model for the downstream task. In some implementations, the training of the vision-language model 180 at the computing device 100 may be direct training of an initial version of the vision-language model 180 for the downstream task.

The computing device 100 trains the vision-language model 180 end-to-end by using image-text pairs in the training dataset 170. By training, the vision-language model 180 may learn, from the image-text pairs, visual representation, language representation and associations between vision and language. How the vision-language model 180 learns visual representation, language representation and associations between vision and language by training is described below with reference to FIGS. 2 to 5.

System Architecture

Figure 2:
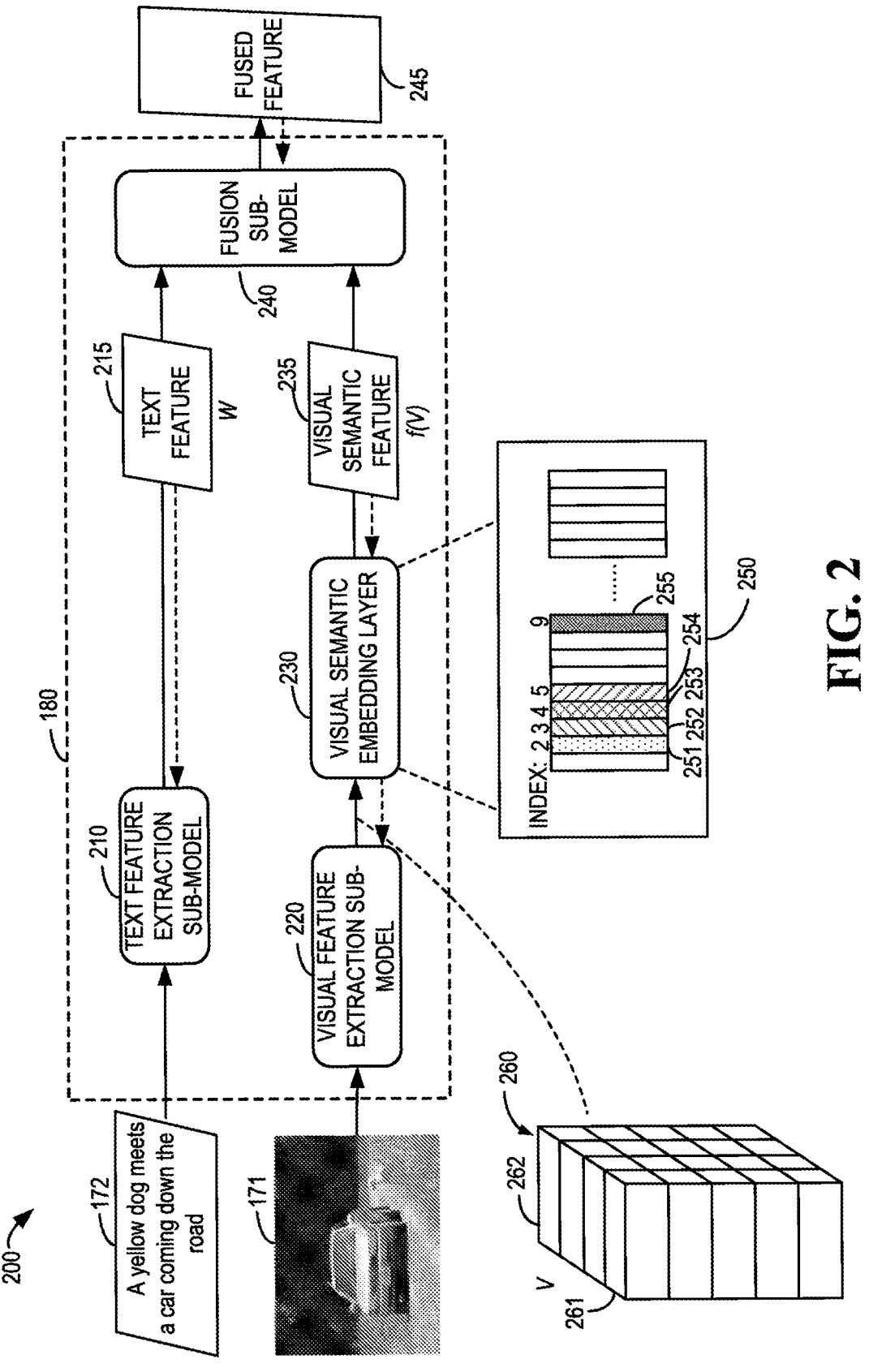
FIG. 2 illustrates an architecture diagram of training a vision-language model according to implementations of the present disclosure.

FIG. 2 shows an architecture diagram 200 of training the vision-language model 180 according to some implementations of the present disclosure. As shown in FIG. 2, the vision-language model 180 generally may comprise a text feature extraction sub-model 210, a visual feature extraction sub-model 220, a visual semantic embedding layer 230, and a fusion sub-model 240. It should be understood that the structure and functionality of the vision-language model 180 are described only for the purpose of illustration rather than suggesting any limitation on the scope of the present disclosure. Implementations of the present disclosure may also be embodied in different structures and/or functionality.

The text feature extraction sub-model 210 is configured to extract a set of text features of a text (which comprises a training text in the training stage, and an input text in the inference stage). Each text feature is corresponding to at least one word in the text. For example, the text feature extraction sub-model 10 may tokenize the text to obtain tokens of the text. The text feature extraction sub-model 210 may be implemented using any appropriate framework or network. As an example, the text feature extraction sub-model 210 may be implemented using a bi-directional encoder representation from transformers (BERT).

As shown in FIG. 2, in the training stage, the text feature extraction sub-model 210 extracts a set of text features 215 of the input text 172. Each text feature in the set of text features 215 is corresponding to at least one word in the training text 172. The set of text features 215 may be denoted as $\mathcal{W}$, and the $i^{th}$ embedded vector in $\mathcal{W}$ may be denoted as $w_i$. That is, each embedded vector $w_i$ is corresponding to at least one word in the training text 172. In the example of FIG. 2, embedded vectors $w_i$ to $w_{10}$ in $\mathcal{W}$ may correspond to words "a," "yellow," "dog," "meets," "a," "car," "coming," "down," "the" and "road" respectively. It should be understood that the number of embedded vectors $w_i$ depends on the length of the training text 172 and the granularity for dividing the text. Herein, it is supposed that each embedded vector $w_i$ has a dimension c.

Description has been presented on how the vision-language model 180 processes the text in the language domain. In the visual domain, the vision-language model 180 comprises the visual feature extraction sub-model 220, which is configured to extract a set of visual features of an image (which comprises a training image in the training stage, and an input image in the inference stage). Each visual feature is corresponding to a pixel block in the image.

As shown in FIG. 2, in the training stage, the visual feature extraction sub-model 220 extracts a set of visual features 260 of the training image 171. Each visual feature in the set of visual features 260 is corresponding to a pixel block in the training image 171. FIG. 2 shows a visual feature 261 corresponding to the upper-left pixel block in the training image 171, and a visual feature 262 corresponding to the upper-right pixel block in the training image 171. The set of visual features 260 may be denoted as $\mathcal{V}$, and the training image 171 may be denoted as $\mathcal{I}$. Then, the set of visual features 260 may be obtained from the equation below:

$$\mathcal{V} = E(\mathcal{I}, \theta) \in R^{l \times c} \qquad (1)$$

where $E(\cdot; \theta)$ is the visual feature extraction sub-model 220 with parameters $\theta$; $v_i$ denotes the $i^{th}$ feature vector of $\mathcal{V}$, 1 denotes the number of feature vectors $v_i$ in $\mathcal{V}$; c denotes the number of dimensions of each feature vector $v_i$, which has the same dimensions as the text feature 215. In addition, the value of 1, i.e., the number of feature vectors $v_i$ in $\mathcal{V}$, depends on the number of pixel blocks into which the training image 171 is divided.

The visual feature extraction sub-model 220 may be implemented as a trainable visual feature encoder. During the training of the vision-language model 180, the visual feature extraction sub-model 220 is trained together. Any appropriate framework and network may be used to implement the visual feature extraction sub-model 220. Only as an example, a residual network followed by a 1×1 convolutional layer and a 2×2 max pooling layer may be adopted as the architecture of the visual feature extraction sub-model 220.

The trainable visual feature extraction sub-model 220, e.g., a Convolutional Neural Network (CNN) encoder, is used in the vision-language model 180. The visual feature extraction sub-model 220 takes the whole image as input and produces image-level visual features instead of region-level features. In this way, complete visual information in the training image can be kept. As compared with the above mentioned existing approaches, without the limitation of bounding boxes, the visual feature extraction sub-model 220 can be end-to-end trained and updated, thus optimizing the cross-modal learning.

The visual features 260 extracted by the visual feature extraction sub-model 220 are more diverse than the text features 215, which brings a difficulty to the cross-modal learning. Given that, the vision-language model 180 further comprises a visual semantic dictionary 250, which is also be referred to as a visual dictionary (VD) for short. In general, the visual features 260 extracted by the visual feature extraction sub-model 220 are low-level image features, such as a color feature, a shape feature, a pattern feature, etc.; by utilizing the visual semantic dictionary 250, the low-level image features with similar visual semantics may be aggregated to the same visual semantic, i.e., may be represented by the same visual semantic feature.

The visual semantic dictionary 250 comprises a plurality of candidate semantic features with indexes. FIG. 2 schematically shows a candidate semantic feature 251 with an index 2, a candidate semantic feature 252 with an index 3, a candidate semantic feature 253 with an index 4, a candidate semantic feature 254 with an index 5, and a candidate semantic feature 255 with an index 9. As will be described with reference to FIG. 3 below, the visual semantic dictionary 250 is updated with the training of the vision-language model 180 in the training stage.

As shown in FIG. 2, the set of visual features 260 extracted by the visual feature extraction sub-model 220 are input to the visual semantic embedding layer 230. The visual semantic embedding layer 230 determines a set of visual semantic features 235 corresponding to the set of visual features 260 based on the visual semantic dictionary 250. It is to be understood that since each visual feature in the set of visual features 260 is corresponding to a pixel block in the training image 171, each visual semantic feature in the set of visual semantic features 235 also is corresponding to the pixel block in the training image 171. Embedding of the visual semantic dictionary 250 implemented by the visual semantic embedding layer 230 is defined as a mapping function $f$ herein. Accordingly, the set of visual semantic features 235 may be denoted as $f(\mathcal{V})$. Operations of the visual semantic embedding layer 230 will be described in detail with reference to FIG. 3.

Next, the vision-language model 180 is trained based on the text features 215 in the language domain and the visual semantic features 235 in the visual domain. In the example of FIG. 2, for the cross-modal processing, the fusion sub-model 240 in the vision-language model 180 is configured to generate a set of fused features 245 for the training text 172 and he training image 171 based on the visual semantic features 235 and the text features 215. Any appropriate framework or network may be used to implement the fusion sub-model 240. For example, a multi-layer transformer may be used to implement the fusion sub-model 240. Such a multi-layer transformer may learn cross-modal representations with the fusion of features in the visual domain and features in the language domain. It is to be understood that the fusion sub-model 240 and the fused feature 245 shown in FIG. 2 are merely exemplary. In implementations of the present disclosure, any appropriate sub-model may be used to combine the text features and the visual semantic features.

In the training stage, an objective function may be determined based on the fused feature 245, and the vision-language model 180 may be trained by minimizing the objective function. In some implementations, the training of the vision-language model 180 may be pre-training. In such implementations, the objective function may be determined with respect to one or more universal tasks for the pre-training. Universal tasks may comprise determining whether the image and text are matched, predicting the masked text feature, predicting the masked visual semantic feature, etc., as to be described with reference to FIG. 4 below.

In some implementations, the training of the vision-language model 180 may be the fine-tuning or training for a specific downstream task. In such implementations, the objective function may be determined with respect to the specific downstream task.

Embedding of Visual Semantic Features

Figure 3:
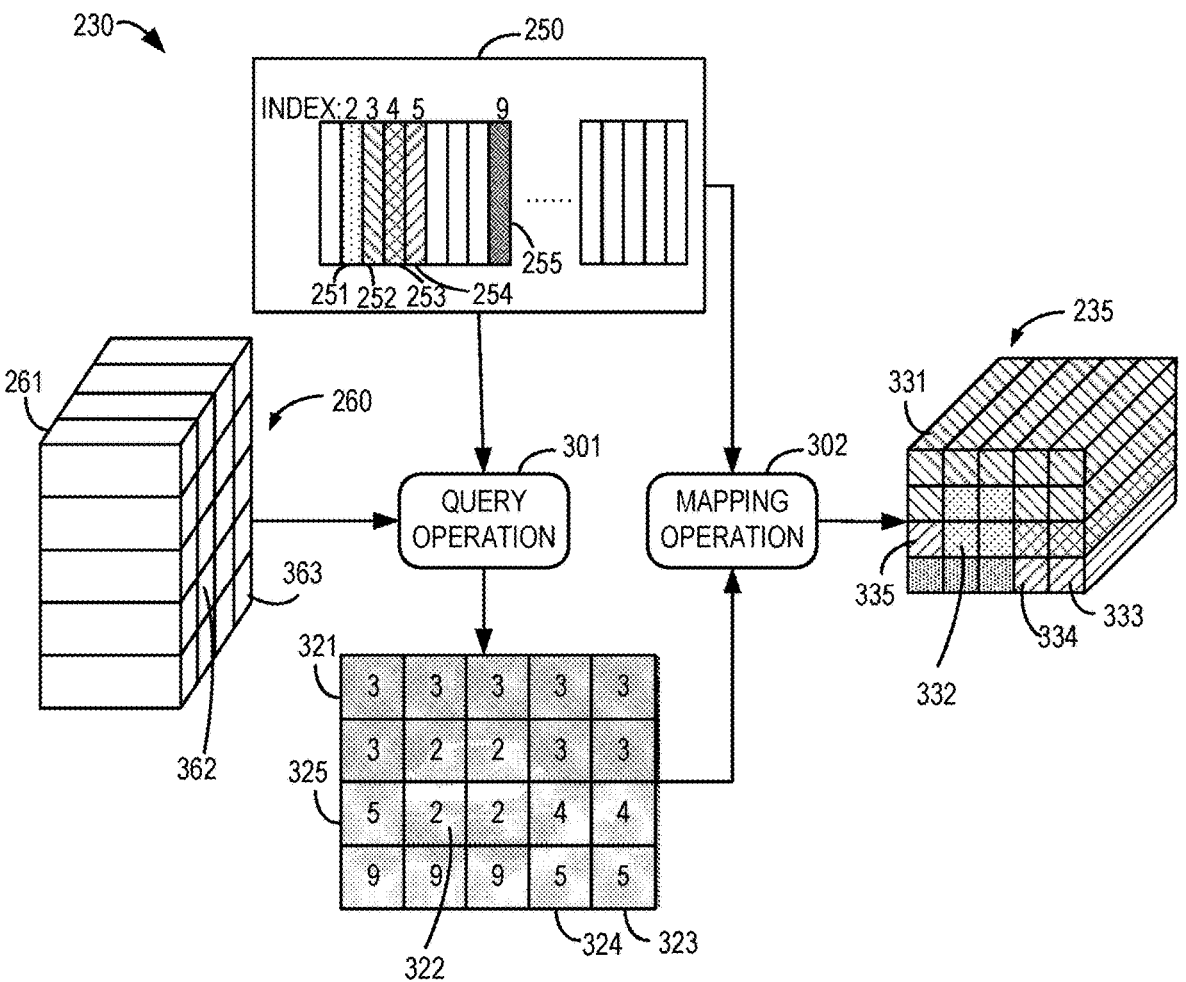
FIG. 3 illustrates a schematic diagram of a visual semantic embedding layer according to some implementations of the present disclosure.

FIG. 3 shows a schematic diagram of the visual semantic embedding layer 230 according to some implementations of the present disclosure. As shown in FIG. 3, the visual semantic embedding layer at least comprises a query operation 301 and a mapping operation 302. The query operation 301 determines from the visual semantic dictionary 250 at least one candidate semantic feature to which the set of visual features 260 of the training image 171 is mapped. Specifically, for the visual feature $v_i$, the query operation 301 may determine from the visual semantic dictionary 250 a candidate semantic feature which is most similar to the visual feature $v_i$.

The candidate semantic feature to which the set of visual features 260 is mapped may be denoted as an index of the candidate semantic feature in the visual semantic dictionary 250. As used herein, the visual semantic dictionary 250 is defined as a matrix $\mathcal{D} \in R^{k \times c}$, which contains k embedding vectors with a dimension of c. The $j^{th}$ embedding vector $d_j$ denotes the $j^{th}$ candidate semantic feature. For the visual feature $v_i$, the index (also referred to as "mapping index") of the candidate semantic feature to which the visual feature $v_i$ is mapped may be computed by searching the nearest neighbor of $v_i$ in $\mathcal{D}$ :

$$h_i = \arg\min_j \| \boldsymbol{v}_i - d_j \|_2 \tag{2}$$

where $h_i$ denotes the mapping index of the $i^{th}$ visual feature $v_i$.

In the example of FIG. 3, visual features in the set of visual features 260 are mapped to the candidate semantic feature 251 with the index 2, the candidate semantic feature 252 with the index 3, the candidate semantic feature 253 with the index 4, the candidate semantic feature 254 with the index 5, and the candidate semantic feature 255 with the index 9 respectively. For example, the visual feature 261 is mapped to the candidate semantic feature 252 with the index 3; the visual feature 362 is mapped to the candidate semantic feature 251 with the index 2; and the visual feature 363 is mapped to the candidate semantic feature 253 with the index 5.

Since each visual feature is corresponding to a pixel block in the training image 171, the candidate semantic feature to which each visual feature is mapped is corresponding to a corresponding pixel block. FIG. 3 schematically shows the index of the candidate semantic feature to which each pixel block corresponds. For example, a pixel block 321 corresponding to the visual feature 261 is corresponding to the candidate semantic feature with the index 3; a pixel block 322 corresponding to the visual feature 362 is corresponding to the candidate semantic feature with the index 2; and a pixel block 323 corresponding to the visual feature 363 is corresponding to the candidate semantic feature with the index 5.

Next, the mapping operation 302 generates the set of visual semantic features 235 corresponding to the set of visual features 260 based on the candidate semantic features to which the set of visual features 260 is mapped. Accordingly, each visual semantic feature in the set of visual semantic features 235 is mapped to a candidate semantic feature in the visual semantic dictionary 250. The index of the mapped candidate semantic feature may be regarded as the mapping index of the visual semantic feature. For example, the visual semantic features 333, 334 and 335 have the mapping index 5; the visual semantic feature 332 has the mapping index 2; and the visual semantic feature 331 has the mapping index 3.

In some implementations, for the visual feature $v_i$, the mapping operation 302 may determine the candidate semantic feature to which the visual feature $v_i$ is mapped as the visual semantic feature corresponding to the visual feature $v_i$. For example, the mapping operation 302 may determine the candidate semantic feature 251 with the index 3 as the visual semantic feature corresponding to the visual feature 261.

As mentioned above, the embedding of the visual semantic dictionary 250 implemented by the visual semantic embedding layer 230 may be defined as the mapping function $f$, and $f(\mathcal{V})$ is used to denote the set of visual semantic features 235. Then, in such an implementation, the visual semantic feature $f(v_i)$ corresponding to the visual feature $v_i$ is denoted by the equation below:

$$f(\boldsymbol{v}_i) = d_{h_i} \tag{3}$$

where the embedding vector $d_{h_i}$ nearest to the visual feature $v_i$ is used for the visual feature $v_i$.

In implementations where the training of the vision-language model 180 is fine-tuning for a downstream task, the visual semantic feature $f(v_i)$ may be determined by equation (3). This is because the visual semantic dictionary 250 has learned the representations of the visual semantic features in the pre-training stage before the fine-tuning.

In some implementations, the mapping operation 302 may update the visual semantic dictionary 250 based on the set of visual features 260 and determine the set of visual semantic features 235 based on the updated visual semantic dictionary 250. Specifically, for a certain candidate semantic feature in the visual semantic dictionary 250, the mapping operation 302 may determine from the set of visual features 260 one or more visual features to which the candidate semantic feature is mapped, and update the candidate semantic feature based on the determined one or more visual features. The updated candidate semantic feature is determined as the visual semantic feature corresponding to the one or more visual features.

In the example of FIG. 3, the visual features corresponding to the pixel blocks 323, 324 and 325 are mapped to the candidate semantic feature 253 with the index 5. Accordingly, the candidate semantic feature 253 with the index 5 is updated based on the visual features corresponding to the pixel blocks 323, 324 and 325. In the set of visual semantic features 235, the visual semantic features 333, 334 and 335 corresponding to the pixel blocks 323, 324 and 325 are determined as the updated candidate semantic feature with the index 5.

$f^{-1}(j)$ is denoted as an inverse mapping function of $f$, which maps the index j back to one or more visual features in the set of visual features 260. $|f^{-1}(j)|$ is used to represent a group size of the inverse mapping, i.e., the number of the one or more visual features to which the index j is mapped back. For example, in FIG. 3, values of $|f^{-1}(2)|$, $|f^{-1}(3)|$, $|f^{-1}(4)|$, $|f^{-1}(5)|$ and $|f^{-1}(9)|$ are 4, 8, 2, 3 and 3, respectively.

As an example, the visual semantic dictionary 250 may be updated using a momentum method. The visual semantic dictionary 250 denoted as $\mathcal{D}$ may be randomly initialized, and further updated by a moving average operation in a batch or mini-batch of training. The candidate semantic feature denoted as the embedding vector $d_j$ may be updated according to the equation below:

$$\hat{d}_j = \gamma * d_j + (1-\gamma) * \frac{\sum_{h_i=j} v_i}{\left| f^{-1}(j) \right|} \qquad (4)$$

where $\hat{d}_j$ denotes the updated embedding vector $d_j$; $\gamma$ is a momentum coefficient, which can be considered as a weight for the embedding vector $d_j$. The value range of $\gamma$ is [0, 1], e.g., $\gamma$=0.99.

As shown in equation (4), the candidate semantic feature denoted as the embedding vector $d_j$ is updated based on visual features mapped to the candidate semantic feature, the number of the visual features, and the weight for the candidate semantic feature. Note that the equation (4) is applied only if $|f^{-1}(j)| \neq 0$. In other words, only the candidate semantic feature having a visual feature mapped thereto is updated in the batch or mini-batch of training.

In such implementations, the mapping operation 302 may determine the set of visual semantic features 235 based on the updated candidate semantic features. For example, the visual semantic feature $f(v_i)$ corresponding to the visual feature $v_i$ is represented by the equation below:

$$f(v_i) = \hat{d}_{h_i} \qquad (5)$$

where the updated embedding vector $d_{h_i}$ is used for the visual feature $v_i$.

In the example of FIG. 3, the visual semantic feature 331 corresponding to the pixel block 321 is determined as the updated candidate semantic feature 252 with the index 3. The visual semantic feature 332 corresponding to the pixel block 322 is determined as the updated candidate semantic feature 251 with the index 2.

As the vision-language model 180 is trained by using different batches of image-text pairs, the visual semantic dictionary 250 is updated accordingly. Since the argmin operation in equation (2) is not differentiable, the gradient back propagation would be stopped by the visual semantic dictionary 250. To make the visual feature extraction sub-model 220 trainable, $f(v_i)$ may be updated according to the equation below:

$$f(v_i) = sg[d_{h_i} - v_i] + v_i \qquad (6)$$

where sg[·] is the stop gradient operator.

Description has been presented to the operation of the visual semantic embedding layer and the updating of the visual semantic dictionary. The role of updating the visual semantic dictionary 250 can be understood as follows: the visual semantic dictionary 250 performs clustering on visual features based on similarities between the visual features; visual features having similar semantics will be aggregated into the same cluster. In other words, the visual features having similar semantics are mapped to the same visual semantic feature, and the index of the visual semantic feature may be considered as a visual semantic label. The visual semantic dictionary 250 is updated with the training of the vision-language model 180, and thus will be affected by the vision-language tasks for training (as to be described below). In this way, the candidate semantic feature (i.e., the embedding vector $d_j$ in $\mathcal{D}$) in the visual semantic dictionary 250 is more suitable for cross-modal understanding and alignment.

Training Task

Figure 4:
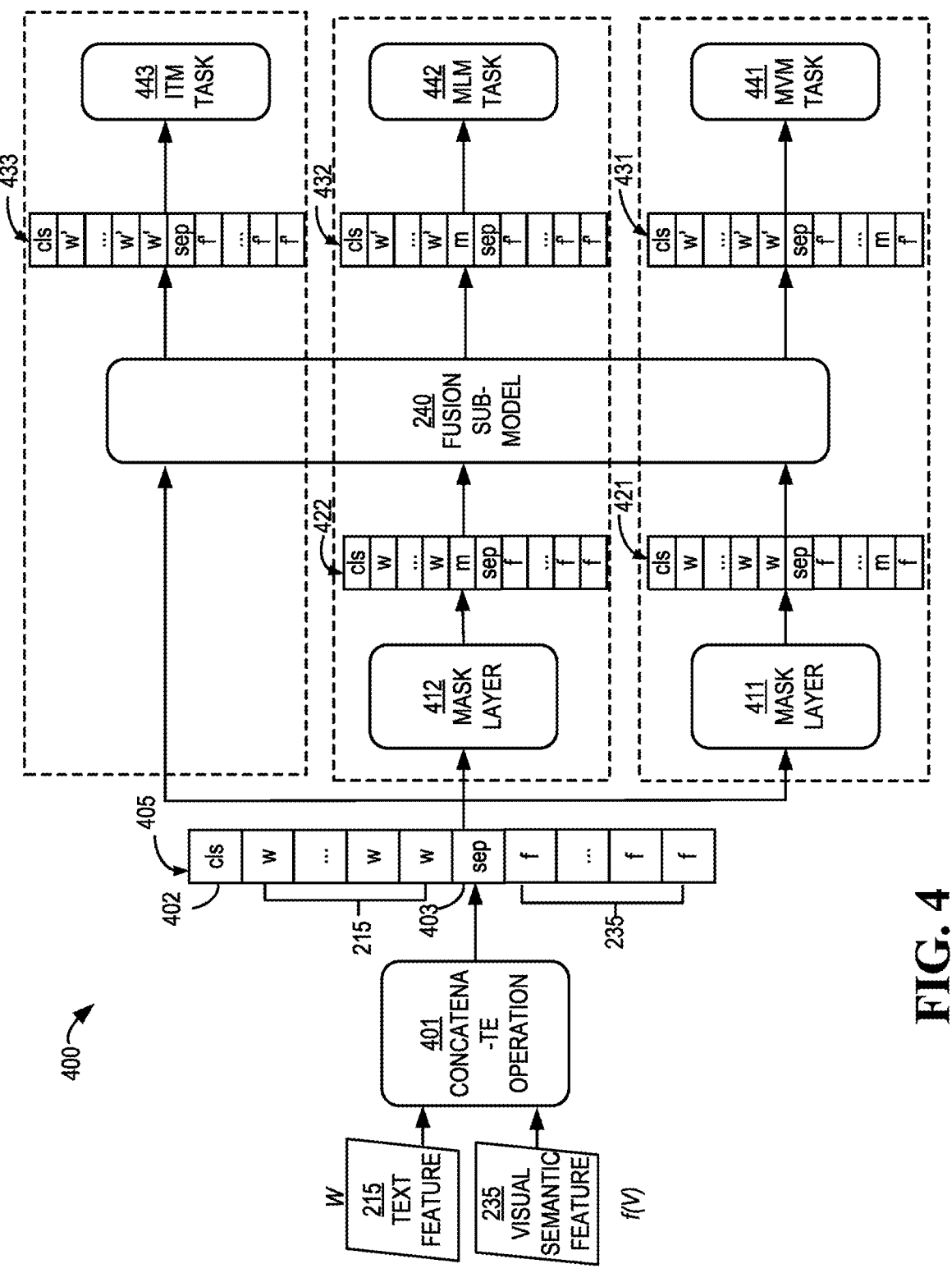
FIG. 4 illustrates a schematic diagram of pre-training based on a plurality of universal tasks according to some implementations of the present disclosure.

As mentioned above, in some implementations, the training of the vision-language model 180 may be pre-training. In such implementations, the vision-language model 180 may be pre-trained with respect to one or more universal tasks. Universal tasks may comprise determining whether image and text are matched, predicting masked text features, predicting masked visual semantic features, etc. FIG. 4 shows a schematic diagram 400 of pre-training based on a plurality of universal tasks according to some implementations of the present disclosure. The example of FIG. 4 comprises a Masked Visual Modeling (MVM) task 441 for predicting masked visual semantic features, a Masked Language Modeling (MLM) task 442 for predicting masked text features, and an Image-Text Matching (ITM) task 443 for determining whether image and text are matched.

Before the visual semantic features 235 in the visual domain and the text features 215 in the language domain are applied to the fusion sub-model 240, the visual semantic features 235 and the text features 215 are pre-processed first. As shown in FIG. 4, a concatenate operation 401 concatenates the text features 215 denoted as $\mathcal{W}$ and the visual semantic features 235 denoted as $\eta(\mathcal{V})$ together to form a concatenated feature 405 as an input sequence for cross-modal learning. In addition to the text features 215 and the visual semantic features 235, the concatenate operation 401 adds two special tokens into the concatenated feature 405, i.e., a token [CLS] 402 and a token [SEP] 403. The token [CLS] 402 is used to indicate classification position, output at which may be used for a subsequent classification task. The token [SEP] 403 is used to indicate the end of the text feature, i.e., used to divide language-domain features and visual-domain features.

For the MLM task 442, a mask layer 412 takes the concatenated feature 405 as input and applies a mask (indicated as "m" in FIG. 4) to one or more text features in the set of text features 215 to output a masked concatenated feature 422. If the text feature $w_i$ is masked, then the masked concatenated feature 422 comprises unmasked other text features $\mathcal{W}W_{\backslash i}$ and all the visual semantic features $f(\mathcal{V})$. The fusion sub-model 240 generates a fused feature 432 based on the masked concatenated feature 422. Where the fusion sub-model 240 is implemented by a transformer, the fused feature 432 may be considered as a feature with attention applied.

The MLM task 442 may determine an objective function for the task based on the fused feature 432. The MLM task 442 is used to enable the vision-language model 108 to infer language knowledge from visual information and contextual language information. Given that, the goal of the MLM task 442 is to predict the masked text feature $w_i$ based on the unmasked other text features $\mathcal{W}_{\backslash i}$ and all the visual semantic features $f(\mathcal{V})$ by minimizing the log-likelihood. Accordingly, the objective function for the MLM task may be expressed as:

$$\mathcal{L}_{MLM} = -\mathbb{E}_{(\mathcal{W}, f(\mathcal{V}))\sim D} \log p(w_i | \mathcal{W}_{\backslash i}, f(\mathcal{V})) \qquad (7)$$

where D indicates hereinafter the whole training dataset 170. That is, the objective function for the MLM task is determined based on a difference between the predicted text feature and the actual text feature $w_i$. Any appropriate masking strategy may be adopted for the MLM task, e.g., the masking strategy same as that used in BERT.

For the MVM task 441, a mask layer 411 takes the concatenated feature 405 as input and applies a mask (indicated as "m" in FIG. 4) to one or more visual semantic features in the set of visual semantic features 235 to output a masked concatenated feature 421. If the text feature $f(v_j)$ is masked, then the masked concatenated feature 421 comprises unmasked other text features $f(\mathcal{V})_{\backslash j}$ and all the text features $\mathcal{W}$. The fusion sub-model 240 generates a fused feature 431 based on the masked concatenated feature 421. Where the fusion sub-model 240 is implemented by a transformer, the fused feature 431 may be considered as a feature with attention applied.

The MVM task 441 may determine an objective function for the task based on the fused feature 431. The MVM task 441 is used to enable the vision-language model 108 to infer visual knowledge from language information and contextual visual information. Given that, the goal of the MVM task 441 is to predict the masked visual semantic feature $f(v_j)$ based on the unmasked other text features $f(\mathcal{V})_{\backslash j}$ and all the text features $\mathcal{W}$ by minimizing the log-likelihood. Accordingly, the objective function for the MVM task may be expressed as:

$$\mathcal{L}_{MVM} = -\mathbb{E}_{(\mathcal{W},f(\mathcal{V}))\sim D} \log p(f(v_j)|\mathcal{W}, f(\mathcal{V})_{\backslash j}) \qquad (8)$$

where D indicates hereinafter the whole training dataset 170. That is, the objective function for the MVM task is determined based on a difference between the predicted visual semantic feature and the actual visual semantic feature $f(v_j)$.

When the visual semantic feature $f(v_j)$ is masked, the mapping index $h_j$ for the visual semantic feature $f(v_j)$ in the visual semantic dictionary 250 may be considered as its label. As shown in FIG. 3, neighbor visual semantic features might have similar values, and thus share the same mapping index. For example, the visual semantic features 333 and 334 both have a mapping index 5, i.e., correspond to the candidate semantic feature with the index 5. This would cause the vision-language model 180 to directly copy the mapping index from surrounding features of the masked visual semantic feature $f(v_j)$ for the prediction. To prevent this, the masked visual semantic features may correspond to the same candidate semantic feature in the visual semantic dictionary 250. For example, the mask layer 411 may randomly select the mapping index j of any visual semantic feature in the set of visual semantic features 235, and then replace all visual semantic features having the mapping index j with the special token [MASK]. That is, the mask layer 411 may replace all embedding vectors in $f^{-1}(j)$ with an embedding vector corresponding to the token [MASK].

For the ITM task 443, the fusion sub-model 240 takes the concatenated feature 405 as input and generates a fused feature 433 based on the concatenated feature 405. Where the fusion sub-model 240 is implemented as a transformer, the fused feature 433 may be considered as a feature with attention applied.

The ITM task 443 may determine an objective function for the task based on the fused feature 433. The ITM task 443 is used to enable the vision-language model 180 to build a mapping between language domain and visual domain features so as to enhance the cross-modal matching. Given that, the ITM task 443 may apply a binary classifier $\varphi(\cdot)$ on token [CLS] in the fused feature 433 to predict whether the training image and training text are matched. Accordingly, the objective function for the ITM task may be expressed as the equation below:

$$\mathcal{L}_{ITM} = -\mathbb{E}_{(\mathcal{W},f(\mathcal{V}))\sim D} \log p(y|\phi(\mathcal{W}, f(\mathcal{V}))) \qquad (9)$$

where $y \in \{0, 1\}$ indicates whether the image and text are matched, e.g., $y=1$ indicates that they are matched, and $y=0$ indicates that they are not matched.

The visual feature extraction sub-model 220, the visual semantic embedding layer 230 (especially the visual semantic dictionary 250), and the text feature extraction sub-model 210 and the fusion sub-model 240 may be jointly end-to-end trained based on the above described universal tasks. If suppose that equal loss weights are assigned to the three tasks, then the full pre-training objective function may be expressed as the equation below:

$$\mathcal{L}_{Pre\text{-}training} = \mathcal{L}_{MLM} + \mathcal{L}_{MVM} + ITM \qquad (10).$$

The vision-language model 180 may be pre-trained using a large dataset. The vision-language model 180 pre-trained with respect to the universal tasks can learn universal representations for vision-language tasks. Therefore, the vision-language model 180 obtained in this way can have wide applicability.

It should be understood that universal tasks described with reference to FIG. 4 are merely exemplary. In some implementations, the vision-language model 180 may be pre-trained based on more or less universal tasks. Alternatively or in addition, in some implementations, weights assigned to objective functions for different universal tasks may be different. For example, respective magnitudes of the assigned weights may depend on a possible application scenario of the vision-language model 180.

Description has been presented to training tasks in implementations of pre-training. In some implementations, the training of the vision-language model 180 may be fine-tuning or training with respect to specific downstream tasks. In such implementations, the objective function may be determined with respect to a specific downstream task. Downstream tasks may include, but not limited to, image retrieval, text retrieval, VQA, NLVR, VE, text generation based on images, image generation based on text, etc. In fine-tuning or training with respect to downstream tasks, the universal tasks shown in FIG. 4 may be replaced by the downstream tasks. In addition, the pre-processing before inputting the visual semantic features 235 and the text features 215 to the fusion sub-model 240 may also differ depending on specific downstream tasks.

Image retrieval and text retrieval are collectively referred to as image-text retrieval below. In the fine-tuning or training for image-text retrieval, the training dataset comprises both matched image-text pairs and unmatched image-text pairs. To enable the vision-language model 180 to predict correct classification for the matched image-text pairs and the unmatched image-text pairs, the fine-tuning or training for the image-text retrieval may be considered as a binary classification problem. The token [CLS] in the fused feature from the fusion sub-model 240 may be used to predict whether the training image and text are matched or not. This is similar to the ITM task described above.

VQA requires the vision-language model 180 to take an image and a question as input and output an answer. To this end, the fine-tuning or training for VQA may be considered as a multi-classification problem. For example, the token [CLS] in the fused feature from the fusion sub-model 240 may be used for multi-classification.

In the fine-tuning or training for text generation based on images, the training task may be adjusted as below: not masking the visual semantic features of the visual domain but sequentially masking the text features of the language domain in the order of words. The masked text feature is predicted based on the visual semantic features and the preceding text features, so as to fine-tune or train the vision-language model 180. Similarly, in the fine-tuning or training for image generation based on text, text features of the language domain are not masked. Visual features corresponding to pixel blocks of the image are predicted one by one based on the text features, so as to fine-tune or train the vision-language model 180.

The fine-tuning or training with respect to downstream tasks has been described by taking image-text retrieval, VQA, text generation and image generation as examples. In view of the above description and the description with reference to FIG. 4, in implementations of the present disclosure, the vision-language model 180 may be fine-tuned or trained for various specific downstream tasks.

Through the training of the vision-language model 180, e.g., the pre-training with respect to the universal tasks, the fine-tuning with respect to downstream tasks and the training with respect to downstream tasks, the vision-language model 180 may learn representations of image features, representations of text features, and alignment between image and text features. In particular, the visual semantic dictionary 250 updated through training may transform low-layer image features having similar visual semantics into visual semantics.

Figure 5:
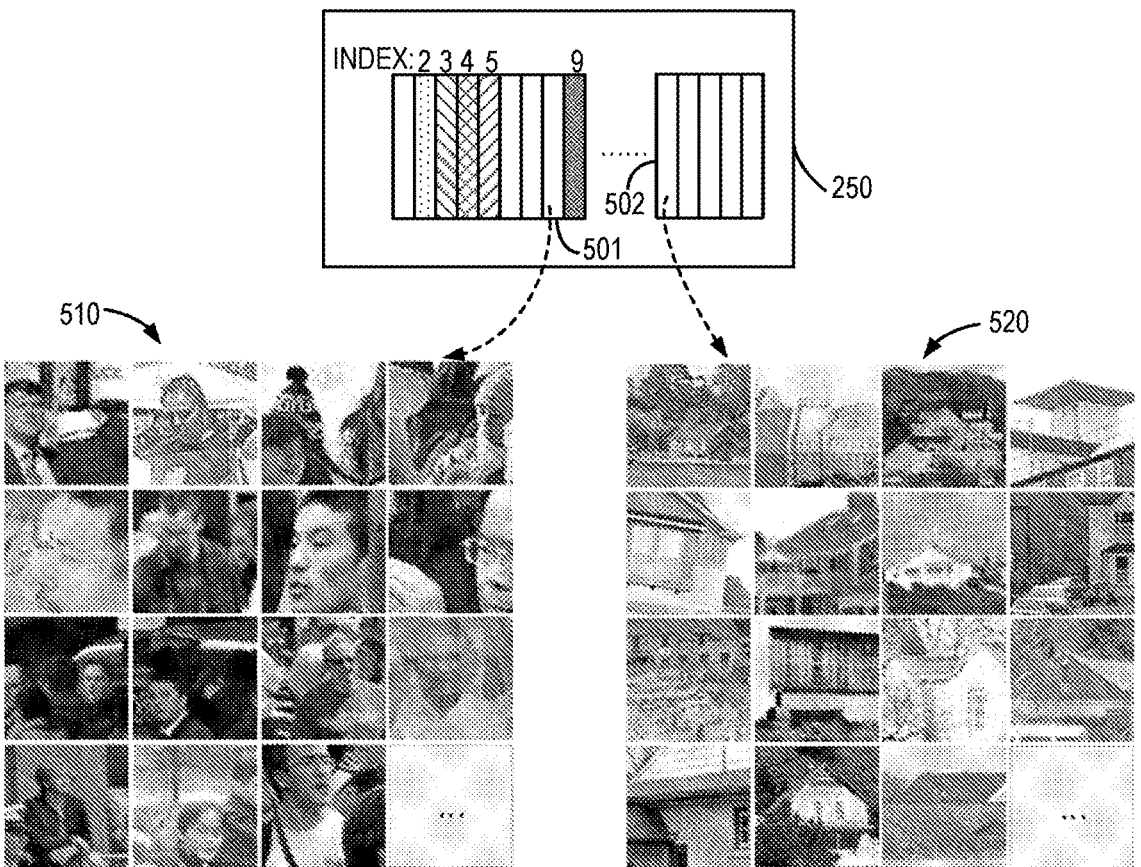
FIG. 5 illustrates an example of a visual semantic dictionary obtained by training the vision-language model according to some implementations of the present disclosure.

FIG. 5 shows an example of the visual semantic dictionary 250 obtained by training the vision-language model according to some implementations of the present disclosure. As described above, a pixel block of the image may correspond to a candidate semantic feature in the visual semantic dictionary 250. FIG. 5 shows a plurality of pixel blocks 510 corresponding to a candidate semantic feature 501, and a plurality of pixel blocks 520 corresponding to a candidate semantic feature 502 in the visual semantic dictionary 250 obtained by the training. As seen from FIG. 5, the candidate semantic feature 501 reflects the semantic "people," while the candidate semantic feature 502 reflects the semantic "building." It should be understood that the respective pixel blocks shown in FIG. 5 are merely for the purpose of illustrating the visual semantic dictionary 250, rather than limiting the scope of the present disclosure.

Example Application Scenario

Figure 6:
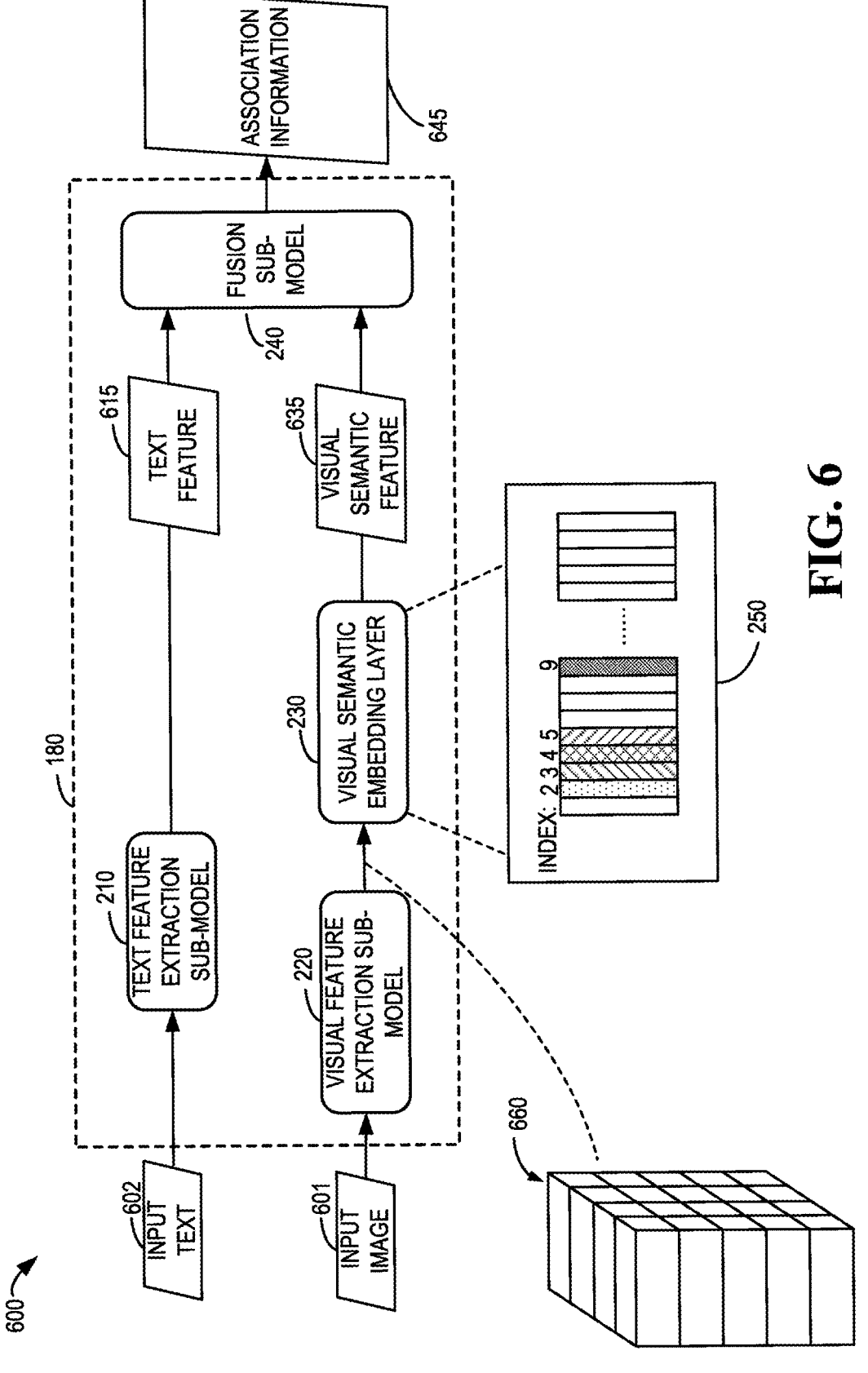
FIG. 6 illustrates an architecture diagram of applying the vision-language model according to some implementations of the present disclosure.

FIG. 6 shows an architecture diagram 600 of applying the vision-language model 180 according to some implementations of the present disclosure. The trained vision-language model 180 may be applied to various vision-language tasks for inference. Such vision-language tasks may include, but not limited to, image retrieval, text retrieval, VQA, NLVR, image generation or text generation.

As shown in FIG. 6, in the language domain, the trained vision-language model 180 comprises the trained text feature extraction sub-model 210. The text feature extraction sub-model 210 extracts a set of text features 615 of an input text 602. Each text feature in the set of text features 615 is corresponding to at least one word in the input text 602.

In the visual domain, the trained vision-language model 180 comprises the trained visual feature extraction sub-model 220 and the trained visual semantic dictionary 250. The visual feature extraction sub-model 220 extracts a set of visual features 660 of an input image 601. Each visual feature in the set of visual features 660 is corresponding to a pixel block in the input image 601.

The set of visual features 660 extracted by the trained visual feature extraction sub-model 220 is input to the visual semantic embedding layer 230. The visual semantic embedding layer 230 determines a set of visual semantic features 635 corresponding to the set of visual features 660 based on the visual semantic dictionary 250. The visual semantic dictionary 250 comprises a plurality of candidate semantic features with indexes. Specifically, for each visual feature in the set of visual features 660, the visual semantic embedding layer 230 determines from the visual semantic dictionary 250 a candidate semantic feature most similar to the visual feature, and treats the determined candidate semantic feature as a visual semantic feature corresponding to the visual feature.

Next, association information 645 between the input text 602 and the input image 601 is determined based on the set of visual semantic features 635 and the set of text features 615. For example, as shown in FIG. 6, the trained fusion sub-model 240 may determine the association information 645 between the input text 602 and the input image 601 based on the set of visual semantic features 635 and the set of text features 615. The association information may be, for example, the visual semantic features and the text features with attention applied.

In a scenario of image retrieval, the input text 602 may be a text input by a user initiating the image retrieval or specified in other way, and the input image 601 may be a candidate image in an image store. The association information 645 may be used to determine whether the input image 601 and the input text 602 are matched or not.

In a scenario of text retrieval, the input image 601 may be an image input by a user initiating the text retrieval or specified in other way, and the input text 6021 may be a candidate text in a text store. The association information 645 may be used to determine whether the input text 602 and the input image 601 are matched or not.

In a scenario of VQA, the input text 602 may be a question, and the input image 601 may be an image to which the question is directed. The association information 645 may be used to determine from the input image 601 an answer to the question.

In a scenario of NLVR, the input text 602 may be a description, and the input image 601 may comprise a pair of images. The association information 645 may be used to determine whether the description is related to or consistent with the pair of images.

In a scenario of image generation, the input text 602 may be a description of a desired target image, and the input image 601 may be a reference image. The association information may be used to determine pixel blocks or regions of the reference image related to the description so as to generate the target image.

In a scenario of text generation, the input image 601 may be an image matching a desired target text, and the input text 602 may be a reference text. The association information may be used to determine from the reference text a caption which can describe the input image 601, so as to generate the target text.

Example Method

FIG. 7 shows a flowchart of a method 700 for training a target model according to some implementations of the present disclosure. The method 700 may be implemented by the computing device 100, e.g., may be implemented at the multi-modal processing module 122 in the memory 120 of the computing device 100.

As shown in FIG. 7, at block 710, the computing device 100 extracts a set of visual features of a training image according to a visual feature extraction sub-model in a target model. Each visual feature is corresponding to a pixel block in the training image. At block 720, the computing device 100 determines a set of visual semantic features corresponding to the set of visual features based on a visual semantic dictionary. At block 730, the computing device 100 extracts a set of text features of a training text corresponding to the training image according to a text feature extraction sub-model in the target model. Each text feature is corresponding to at least one word in the training text. At block 740, the computing device 100 trains the target model based on the set of visual semantic features and the set of text features to determine association information between an input text and an input image.

In some implementations, determining the set of visual semantic features based on the visual semantic dictionary comprises: determining from the visual semantic dictionary at least one candidate semantic feature to which the set of visual features is mapped; updating the at least one candidate semantic feature based on the set of visual features; and determining the set of visual semantic features based on the at least one updated candidate semantic feature.

In some implementations, updating the at least one candidate semantic feature comprises: for a specified candidate semantic feature of the at least one candidate semantic feature, determining, from the set of visual features, at least one visual feature mapped to the specified candidate semantic feature; and updating the specified candidate semantic feature based on the at least one visual feature and a weight for the specified candidate semantic feature. Determining the set of visual semantic features based on the at least one updated candidate semantic feature comprises: determining the updated specified candidate semantic feature as a visual semantic feature of the set of visual semantic features that is corresponding to the at least one visual feature.

In some implementations, training the target model comprises: generating a set of fused features for the training text and the training image based on the set of visual semantic features and the set of text features and according to a fusion sub-model in the target model; determining an objective function based on the set of fused features; and training the target model by minimizing the objective function.

In some implementations, generating the set of fused features comprises: masking at least one visual semantic feature of the set of visual semantic features; generating the set of fused features according to the fusion sub-model and based on the set of text features and the masked set of visual semantic features. Determining the objective function comprises: generating a predicted feature corresponding to the at least one masked visual semantic feature based on the set of fused features; and determining the objective function based on a difference between the predicted feature and the at least one visual semantic feature.

In some implementations, the at least one visual semantic feature is corresponding to a same candidate semantic feature in the visual semantic dictionary.

In some implementations, determining the objective function comprises: determining the objective function based on the set of fused features and a specific task to which the target model is to be applied.

In some implementations, the specific task comprises at least one of: image retrieval, text retrieval, visual question answering, visual reasoning with natural language, image generation, or text generation.

FIG. 8 shows a flowchart of a method 800 for applying a target model according to some implementations of the present disclosure. The method 800 may be implemented by the computing device 100, e.g., may be implemented at the multi-modal processing module 122 in the memory 120 of the computing device 100. The method 800 may also be implemented by a computing device other than the computing device 100.

As shown in FIG. 8, at block 810, the computing device 100 extracts a set of visual features of an input image according to a visual feature extraction sub-model in a trained target model. Each visual feature is corresponding to a pixel block in the input image. At block 820, the computing device 100 determines a set of visual semantic features corresponding to the set of visual features based on a visual semantic dictionary. At block 830, the computing device 100 extracts a set of text features of an input text corresponding to the input image according to a text feature extraction sub-model in the target model. Each text feature is corresponding to at least one word in the input text. At block 840, the computing device 100 determines association information between the input text and the input image based on the set of visual semantic features and the set of text features.

In some implementations, the association information is applied in at least one of the following tasks: image retrieval based on the input text, text retrieval based on the input image, visual question answering related to the input text and the input image, visual reasoning with natural language related to the input text and the input image, image generation based on the input text, or text generation based on the input image.

In implementations where the association information is applied in image retrieval, the input text may be a text input by a user initiating the image retrieval or specified in other way, and the input image may be a candidate image in an image store. The association information may be used to determine whether the input image and the input text are matched or not.

In implementations where the association information is applied in text retrieval, the input image may be an image input by a user initiating the text retrieval or specified in other way, and the input text may be a candidate text in a text store. The association information may be used to determine whether the input text and the input image are matched or not.

In implementations where the association information is applied in VQA, the input text may be a question, and the input image may be an image to which the question is directed. The association information may be used to determine from the input image an answer to the question.

In implementations where the association information is applied in NLVR, the input text may be a description, and the input image may comprise a pair of images. The association information may be used to determine whether the description is related to or consistent with the pair of images.

In implementations where the association information is applied in image generation, the input text may be a description of a desired target image, and the input image may be a reference image. The association information may be used to determine from the reference image pixel blocks or regions related to the description so as to generate the target image.

In implementations where the association information is applied in text generation, the input image may be an image matching a desired target text, and the input text may be a reference text. The association information may be used to determine from the reference text a caption which can describe the input image, so as to generate the target text.

Example Implementations

Some example implementations of the present disclosure are listed below.

In a first aspect, the present disclosure provides a computer-implemented method. The method comprises: extracting a set of visual features of a training image according to a visual feature extraction sub-model in a target model, wherein each visual feature is corresponding to a pixel block in the training image; determining, based on a visual semantic dictionary, a set of visual semantic features corresponding to the set of visual features; extracting a set of text features of a training text corresponding to the training image according to a text feature extraction sub-model in the target model, wherein each text feature is corresponding to at least one word in the training text; and training, based on the set of visual semantic features and the set of text features, the target model to determine association information between an input text and an input image.

In some implementations, determining the set of visual semantic features based on the visual semantic dictionary comprises: determining, from the visual semantic dictionary, at least one candidate semantic feature to which the set of visual features is mapped; updating the at least one candidate semantic feature based on the set of visual features; and determining the set of visual semantic features based on the at least one updated candidate semantic feature.

In some implementations, updating the at least one candidate semantic feature comprises: for a specified candidate semantic feature of the at least one candidate semantic feature, determining, from the set of visual features, at least one visual feature mapped to the specified candidate semantic feature; and updating the specified candidate semantic feature based on the at least one visual feature and a weight for the specified candidate semantic feature, and wherein determining the set of visual semantic features based on the at least one updated candidate semantic feature comprises: determining the updated specified candidate semantic feature as a visual semantic feature of the set of visual semantic features that is corresponding to the at least one visual feature.

In some implementations, training the target model comprises: generating a set of fused features for the training text and the training image based on the set of visual semantic features and the set of text features and according to a fusion sub-model in the target model; determining an objective function based on the set of fused features; and training the target model by minimizing the objective function.

In some implementations, generating the set of fused features comprises: masking at least one visual semantic feature of the set of visual semantic features; generating the set of fused features and according to the fusion sub-model based on the set of text features and the masked set of visual semantic features, and wherein determining the objective function comprises: generating a predicted feature corresponding to the at least one masked visual semantic feature based on the set of fused features; and determining the objective function based on a difference between the predicted feature and the at least one visual semantic feature.

In some implementations, the at least one visual semantic feature is corresponding to the same candidate semantic feature in the visual semantic dictionary.

In some implementations, determining the objective function comprises: determining the objective function based on the set of fused features and a specific task to which the target model is to be applied.

In some implementations, the specific task comprises at least one of: image retrieval, text retrieval, visual question answering, visual reasoning with natural language, image generation, or text generation.

In a second aspect, the present disclosure provides a computer-implemented method. The method comprises: extracting a set of visual features of an input image according to a visual feature extraction sub-model in a trained target model, wherein each visual feature is corresponding to a pixel block in the input image; determining a set of visual semantic features corresponding to the set of visual features based on a visual semantic dictionary; extracting a set of text features of an input text corresponding to the input image according to a text feature extraction sub-model in the target model, wherein each text feature is corresponding to at least one word in the input text; and determining association information between the input text and the input image based on the set of visual semantic features and the set of text features.

In some implementations, the association information is applied in at least one of the following tasks: image retrieval based on the input text, text retrieval based on the input image, visual question answering related to the input text and the input image, visual reasoning with natural language related to the input text and the input image, image generation based on the input text, or text generation based on the input image.

In a third aspect, the present disclosure provides an electronic device. The electronic device comprises: a processing unit; and a memory coupled to the processing unit and comprising instructions stored thereon which, when executed by the processing unit, cause the device to perform acts comprising: extracting a set of visual features of a training image according to a visual feature extraction sub-model in a target model, wherein each visual feature is corresponding to a pixel block in the training image; determining, based on a visual semantic dictionary, a set of visual semantic features corresponding to the set of visual features; extracting a set of text features of a training text corresponding to the training image according to a text feature extraction sub-model in the target model, wherein each text feature is corresponding to at least one word in the training text; and training, based on the set of visual semantic features and the set of text features, the target model to determine association information between an input text and an input image.

In some implementations, determining the set of visual semantic features based on the visual semantic dictionary comprises: determining, from the visual semantic dictionary, at least one candidate semantic feature to which the set of visual features is mapped; updating the at least one candidate semantic feature based on the set of visual features; and determining the set of visual semantic features based on the at least one updated candidate semantic feature.

In some implementations, updating the at least one candidate semantic feature comprises: for a specified candidate semantic feature of the at least one candidate semantic feature, determining, from the set of visual features, at least one visual feature mapped to the specified candidate semantic feature; and updating the specified candidate semantic feature based on the at least one visual feature and a weight for the specified candidate semantic feature, and wherein determining the set of visual semantic features based on the at least one updated candidate semantic feature comprises: determining the updated specified candidate semantic feature as a visual semantic feature of the set of visual semantic features that is corresponding to the at least one visual feature.

In some implementations, training the target model comprises: generating a set of fused features for the training text and the training image based on the set of visual semantic features and the set of text features and according to a fusion sub-model in the target model; determining an objective function based on the set of fused features; and training the target model by minimizing the objective function.

In some implementations, generating the set of fused features comprises: masking at least one visual semantic feature of the set of visual semantic features; generating the set of fused features according to the fusion sub-model and based on the set of text features and the masked set of visual semantic features, and wherein determining the objective function comprises: generating a predicted feature corresponding to the at least one masked visual semantic feature based on the set of fused features; and determining the objective function based on a difference between the predicted feature and the at least one visual semantic feature.

In some implementations, the at least one visual semantic feature is corresponding to the same candidate semantic feature in the visual semantic dictionary.

In some implementations, determining the objective function comprises: determining the objective function based on the set of fused features and a specific task to which the target model is to be applied.

In some implementations, the specific task comprises at least one of: image retrieval, text retrieval, visual question answering, visual reasoning with natural language, image generation, or text generation.

In a fourth aspect, the present disclosure provides an electronic device. The electronic device comprises: a processing unit; and a memory coupled to the processing unit and comprising instructions stored thereon which, when executed by the processing unit, cause the device to perform acts comprising: extracting a set of visual features of an input image according to a visual feature extraction sub-model in a trained target model, wherein each visual feature is corresponding to a pixel block in the input image; determining a set of visual semantic features corresponding to the set of visual features based on a visual semantic dictionary; extracting a set of text features of an input text corresponding to the input image according to a text feature extraction sub-model in the target model, wherein each text feature is corresponding to at least one word in the input text; and determining association information between the input text and the input image based on the set of visual semantic features and the set of text features.

In some implementations, the association information is used for at least one of: image retrieval based on the input text, text retrieval based on the input image, visual question answering related to the input text and the input image, visual reasoning with natural language related to the input text and the input image, image generation based on the input text, or text generation based on the input image.

In a fifth aspect, the present disclosure provides a computer program product being tangibly stored in a non-transitory computer storage medium and comprising machine-executable instructions which, when executed by a device, causing the device to perform the method of the first aspect.

In a sixth aspect, the present disclosure provides a computer program product being tangibly stored in a non-transitory computer storage medium and comprising machine-executable instructions which, when executed by a device, causing the device to perform the method of the second aspect.

In a seventh aspect, the present disclosure provides a computer-readable medium having machine-executable instructions stored thereon which, when executed by a device, cause the device to perform the method of the first aspect.

In an eighth aspect, the present disclosure provides a computer-readable medium having machine-executable instructions stored thereon which, when executed by a device, cause the device to perform the method of the second aspect.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip (SOCs), Complex Programmable Logic Devices (CPLDs), and the like.

Program codes for carrying out methods of the present disclosure may be written in any combination of one or more programming languages. The program codes may be provided to a processor or controller of a general purpose computer, a special purpose computer, or other programmable data processing apparatus, such that the program codes, when executed by the processor or controller, cause the functions/operations specified in the flowcharts and/or block diagrams to be implemented. The program codes may execute entirely on a machine, partly on the machine, partly on the machine and partly on a remote machine, or entirely on the remote machine or a server as a stand-alone software package.

In the context of the present disclosure, a machine-readable medium may be any tangible medium which may contain, or store a program for use by or for use in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the particular order shown or in a sequential order, or all operations shown are required to be executed to achieve the expected results. In certain circumstances, multitasking and parallel processing may be advantageous. Likewise, while several specific implementation details are contained in the above discussions, these should not be construed as limitations on the scope of the present disclosure. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:
1. A computer-implemented method comprising:
  extracting a set of visual features of a training image and training text associated with the training image according to a visual feature extraction sub-model in a target model, wherein:

each visual feature corresponds to a pixel block in the training image; and each visual feature comprises a visual feature vector in a common embedding space;

determining, based on a visual semantic dictionary, a set of visual semantic features corresponding to the set of visual features, wherein each visual semantic feature comprises a visual semantic feature vector in the common embedding space;

extracting a set of text features of a training text corresponding to the training image according to a text feature extraction sub-model in the target model, wherein:

each text feature corresponds to at least one word in the training text;

the training image and the training text comprise an image-text pair of a plurality of image-text pairs, each image-text pair including a label indicating whether the training image and training text are matched or not matched; and each text feature comprises a text feature vector in the common embedding space having a same dimensionality as the visual feature vectors and the visual semantic feature vectors; and training, based on the set of visual semantic features and the set of text features and the label, the target model to determine association information between an input text and an input image.

2. The method of claim 1, wherein determining the set of visual semantic features based on the visual semantic dictionary comprises:

determining, from the visual semantic dictionary, at least one candidate semantic feature to which the set of visual features is mapped;

updating the at least one candidate semantic feature based on the set of visual features; and determining the set of visual semantic features based on the at least one updated candidate semantic feature.

3. The method of claim 2, wherein updating the at least one candidate semantic feature comprises:

for a specified candidate semantic feature of the at least one candidate semantic feature, determining, from the set of visual features, at least one visual feature mapped to the specified candidate semantic feature; and updating the specified candidate semantic feature based on the at least one visual feature and a weight for the specified candidate semantic feature, wherein determining the set of visual semantic features based on the at least one updated candidate semantic feature comprises determining the updated specified candidate semantic feature as a visual semantic feature of the set of visual semantic features that is corresponding to the at least one visual feature.

4. The method of claim 1, wherein training the target model comprises:

generating a set of fused features for the image-text pair, wherein the generating is:

based on the set of visual semantic features and the set of text features; and according to a fusion sub-model in the target model;

determining an objective function based on the set of fused features; and training the target model by minimizing the objective function.

5. The method of claim 4, wherein generating the set of fused features comprises:

masking at least one visual semantic feature of the set of visual semantic features;

generating the set of fused features, wherein the generating is:

according to the fusion sub-model; and based on the set of text features and the masked set of visual semantic features, wherein determining the objective function comprises:

generating a predicted feature corresponding to the at least one masked visual semantic feature based on the set of fused features; and determining the objective function based on a difference between the predicted feature and the at least one visual semantic feature.

6. The method of claim 5, wherein the at least one visual semantic feature corresponds to a same candidate semantic feature in the visual semantic dictionary.

7. The method of claim 4, wherein determining the objective function comprises determining the objective function based on the set of fused features and a specific task to which the target model is to be applied.

8. The method of claim 7, wherein the specific task comprises at least one of:

image retrieval;

text retrieval;

visual question answering;

visual reasoning with natural language;

image generation; or text generation.

9. A computer-implemented method, comprising:

extracting a set of visual features of an input image according to a visual feature extraction sub-model in a trained target model, wherein;

each visual feature corresponds to a pixel block in the input image; and each visual feature comprises a visual feature vector in a common embedding space;

determining a set of visual semantic features corresponding to the set of visual features based on a visual semantic dictionary, wherein each visual semantic feature comprises a visual semantic feature vector in the common embedding space;

extracting a set of text features of a training text corresponding to a training image according to a text feature extraction sub-model in the trained target model, wherein:

each text feature corresponds to at least one word in the training text;

the training image and the training text comprise an image-text pair of a plurality of image-text pairs, each image-text pair including a label indicating whether the training image and training text are matched or not matched; and each text feature comprises a text feature vector in the common embedding space having a same dimensionality as the visual feature vectors and the visual semantic feature vectors; and training, based on the set of visual semantic features and the set of text features and the label, the target model to determine association information between an input text and an input image.

10. The method of claim 9, wherein the association information is applied in at least one of:

image retrieval based on the input text;

text retrieval based on the input image;

visual question answering related to the input text and the input image;

visual reasoning with natural language related to the input text and the input image;

image generation based on the input text; or text generation based on the input image.

11. An electronic device, comprising:

a processing unit; and a memory coupled to the processing unit and comprising instructions stored thereon which, when executed by the processing unit, cause the device to perform acts comprising:

extracting a set of visual features of an input image according to a visual feature extraction sub-model in a trained target model, wherein;

each visual feature corresponds to a pixel block in the input image; and each visual feature comprises a visual feature vector in a common embedding space;

determining a set of visual semantic features corresponding to the set of visual features based on a visual semantic dictionary, wherein each visual semantic feature comprises a visual semantic feature vector in the common embedding space;

extracting a set of text features of a training text corresponding to a training image according to a text feature extraction sub-model in the trained target model, wherein:

each text feature corresponds to at least one word in the training text;

the training image and the training text comprise an image-text pair of a plurality of image-text pairs, each image-text pair including a label indicating whether the training image and training text are matched or not matched; and each text feature comprises a text feature vector in the common embedding space having a same dimensionality as the visual feature vectors and the visual semantic feature vectors; and training, based on the set of visual semantic features and the set of text features and the label, the target model to determine association information between an input text and an input image.

12. The device of claim 11, wherein determining the set of visual semantic features based on the visual semantic dictionary comprises:

determining, from the visual semantic dictionary, at least one candidate semantic feature to which the set of visual features is mapped;

updating the at least one candidate semantic feature based on the set of visual features; and determining the set of visual semantic features based on the at least one updated candidate semantic feature.

13. An electronic device, comprising:

a processing unit; and a memory coupled to the processing unit and comprising instructions stored thereon which, when executed by the processing unit, cause the device to perform acts comprising:

extracting a set of visual features of an input image according to a visual feature extraction sub-model in a trained target model, wherein:

each visual feature corresponds to a pixel block in the input image; and each visual feature comprises a visual feature vector in a common embedding space;

determining a set of visual semantic features corresponding to the set of visual features based on a visual semantic dictionary, wherein each visual semantic feature comprises a visual semantic feature vector in the common embedding space;

extracting a set of text features of a training text corresponding to a training image according to a text feature extraction sub-model in the trained target model, wherein:

each text feature corresponds to at least one word in the training text;

the training image and the training text comprise an image-text pair of a plurality of image-text pairs, each image-text pair including a label indicating whether the training image and training text are matched or not matched; and each text feature comprises a text feature vector in the common embedding space having a same dimensionality as the visual feature vectors and the visual semantic feature vectors; and training, based on the set of visual semantic features and the set of text features and the label, the target model to determine association information between an input text and an input image.

14. A non-transitory computer storage medium, comprising machine-executable instructions which, when executed by a device, cause the device to perform acts comprising:

extracting a set of visual features of a training image and training text associated with the training image according to a visual feature extraction sub-model in a target model, wherein each visual feature is corresponding to a pixel block in the training image, wherein:

each visual feature comprises a visual feature vector in a common embedding space; and the training image and the training text comprise an image-text pair of a plurality of image-text pairs, each image-text pair including a label indicating whether the training image and training text are matched or not matched;

determining, based on a visual semantic dictionary, a set of visual semantic features corresponding to the set of visual features, wherein each visual semantic feature comprises a visual semantic feature vector in the common embedding space;

extracting a set of text features of a training text corresponding to the training image according to a text feature extraction sub-model in the target model, wherein:

each text feature is corresponding to at least one word in the training text; and each text feature comprises a text feature vector in the common embedding space having a same dimensionality as the visual feature vectors and the visual semantic feature vectors; and training, based on the set of visual semantic features and the set of text features, the target model to determine association information between an input text and an input image.

* * * * *